United States Patent
Nakane et al.

(10) Patent No.: US 12,075,912 B2
(45) Date of Patent: Sep. 3, 2024

(54) SEAT DEVICE THAT CAN CONVERT STATE OF SEAT

(71) Applicant: KOITO ELECTRIC INDUSTRIES, LTD., Shizuoka (JP)

(72) Inventors: Masanobu Nakane, Shizuoka (JP); Shunya Ebina, Shizuoka (JP); Yutaka Nagao, Shizuoka (JP)

(73) Assignee: KOITO ELECTRIC INDUSTRIES, LTD., Shizuoka (JP)

( * ) Notice: Subject to any disclaimer, the term of this patent is extended or adjusted under 35 U.S.C. 154(b) by 56 days.

(21) Appl. No.: 17/905,060

(22) PCT Filed: Sep. 16, 2020

(86) PCT No.: PCT/JP2020/035113
§ 371 (c)(1),
(2) Date: Aug. 25, 2022

(87) PCT Pub. No.: WO2021/171666
PCT Pub. Date: Sep. 2, 2021

(65) Prior Publication Data
US 2023/0109265 A1   Apr. 6, 2023

(30) Foreign Application Priority Data
Feb. 28, 2020 (JP) .................................. 2020-034280

(51) Int. Cl.
*A47C 1/024* (2006.01)
*A47C 3/18* (2006.01)

(52) U.S. Cl.
CPC ................. *A47C 1/024* (2013.01); *A47C 3/18* (2013.01)

(58) Field of Classification Search
CPC .. A47C 3/18; A47C 1/024; A47C 1/12; B60N 2/14; B60N 2/06; B60N 2/90; B61D 1/04; B61D 33/00
USPC ...................................................... 297/344.21
See application file for complete search history.

(56) References Cited

FOREIGN PATENT DOCUMENTS

| JP | S58-188334 | U | 12/1983 |
|----|------------|---|---------|
| JP | S60-35634  | A | 2/1985  |
| JP | H4-7933    | U | 1/1992  |
| JP | H8-332877  | A | 12/1996 |
| JP | 3431772    | B2 | 5/2003 |

OTHER PUBLICATIONS

International Search Report for PCT/JP2020/035113 issued on Nov. 24, 2020 by ISA/JPO.

*Primary Examiner* — Milton Nelson, Jr.
(74) *Attorney, Agent, or Firm* — Kubotera & Associates, LLC

(57) ABSTRACT

A seat device that can reliably regulates a reclining operation when in a long state where a back of a seat is along a wall. The seat device (10) that can convert the state of the seat (1) includes a reclining mechanism (50) that can tilt a backrest (3) of the seat (1), wherein an operation of tilting the backrest (3) by the reclining mechanism (50) is disabled when the seat (1) is in the long state.

3 Claims, 11 Drawing Sheets

LONG STATE (ROTATION ANGLE: 0°)

ROTATION ANGLE: 45°

ONE CROSS STATE (ROTATION ANGLE: 90°)

ROTATION ANGLE: 0°

REVERSE CROSS STATE (ROTATION ANGLE: -90°)

SEAT DEVICE THAT CAN CONVERT STATE OF SEAT

TECHNICAL FIELD

The present invention relates to a seat device that can convert the state of a seat.

BACKGROUND ART

Conventionally, there are seats of a stool type mounted in, for example, railroad cars, which are long in both directions and can seat a plurality of persons, and are generally installed along walls in cabins. As for this seat, a rotary seat is known that can be rotated about a rotation axis in the center of the seat to convert the orientation between a long state where the back of the seat is parallel to and along a wall, and a cross state where the back of the seat is orthogonal to the wall.

As for such a rotary seat, a seat device has been proposed that includes a sliding mechanism in addition to a rotation mechanism of the seat, and further includes a transmission mechanism for interlocking each mechanism, so that the trajectory (turning radius) of the seat does not interfere with a wall, when rotating the seat from the long state along the wall to the cross state. Refer to, for example, Patent Literature 1.

That is, in the rotary seat, in order to expand the aisle width between seats on both sides in a cabin as much as possible to obtain a comfortable space, the rotation axis of the seat is located near a wall in the long state, while the rotation axis of the seat is slid to an aisle side in the cross state, so that the seat does not interfere with the wall. Therefore, in the rotary seat, in order to prevent interference with the wall in the long state, the backrest cannot be tilted, and a reclining mechanism for improving seating comfort cannot be provided.

CITATION LIST

Patent Literature

Patent Literature 1: Japanese Patent No. 3431772

SUMMARY OF THE INVENTION

However, with conventional rotating apparatuses, since the reclining mechanism is not provided, not only can the backrest not be tilted, but the aisle width between seats cannot be increased, and the aisle width is narrower than that in ordinary commuter trains. Particularly, there has been a problem that, even in the cross state where the backrest does not interfere with the wall, reclining is not possible and seating comfort is impaired.

The present invention has been made by focusing on the problems of the related art as described above, and an object of the present invention is to provide a seat device that enables a reclining operation of a backrest, can expand the aisle width, can obtain comfortable seating comfort, and can reliably regulate the reclining operation in a specific state (long state) where the reclining operation becomes a problem, even in a seat where rotation and sliding are interlocked.

In order to achieve the aforementioned object, in one aspect of the present invention,
a seat device that can convert a state of a seat includes
a reclining mechanism that can tilt a backrest of a seat,
wherein an operation of tilting the backrest by the reclining mechanism is disabled when the seat is in a specific state.

With the seat device according to the present invention, even when the state of the seat can be converted, the reclining operation of the backrest is enabled, the aisle width can be expanded, comfortable seating comfort can be obtained, and the reclining operation can be reliably regulated when the seat is in the specific state.

DETAILED DESCRIPTION OF PREFERRED EMBODIMENTS

Hereinafter, an embodiment representing the present invention will be described based on the drawings.

FIG. 1 to FIG. 15 show one embodiment of the present invention.

A seat device 10 according to the present embodiment can convert the state of a seat 1. Here, the state of the seat 1 is a concept including not only the orientation of the seat 1 by rotation, but also the change in the front and back position of the seat 1, etc. Additionally, although the kind of the seat 1 is not particularly limited, a case will be described below as an example where the seat 1 is applied to a stool for two persons mounted in a cabin of a railroad car. Note that, in each figure, a slight difference in the shape of an identical part is merely a design change (for example, the difference in the shape of an underframe 30 in FIG. 1 and FIG. 6, etc.).

<Outline of Seat Device 10>

Figure 6:
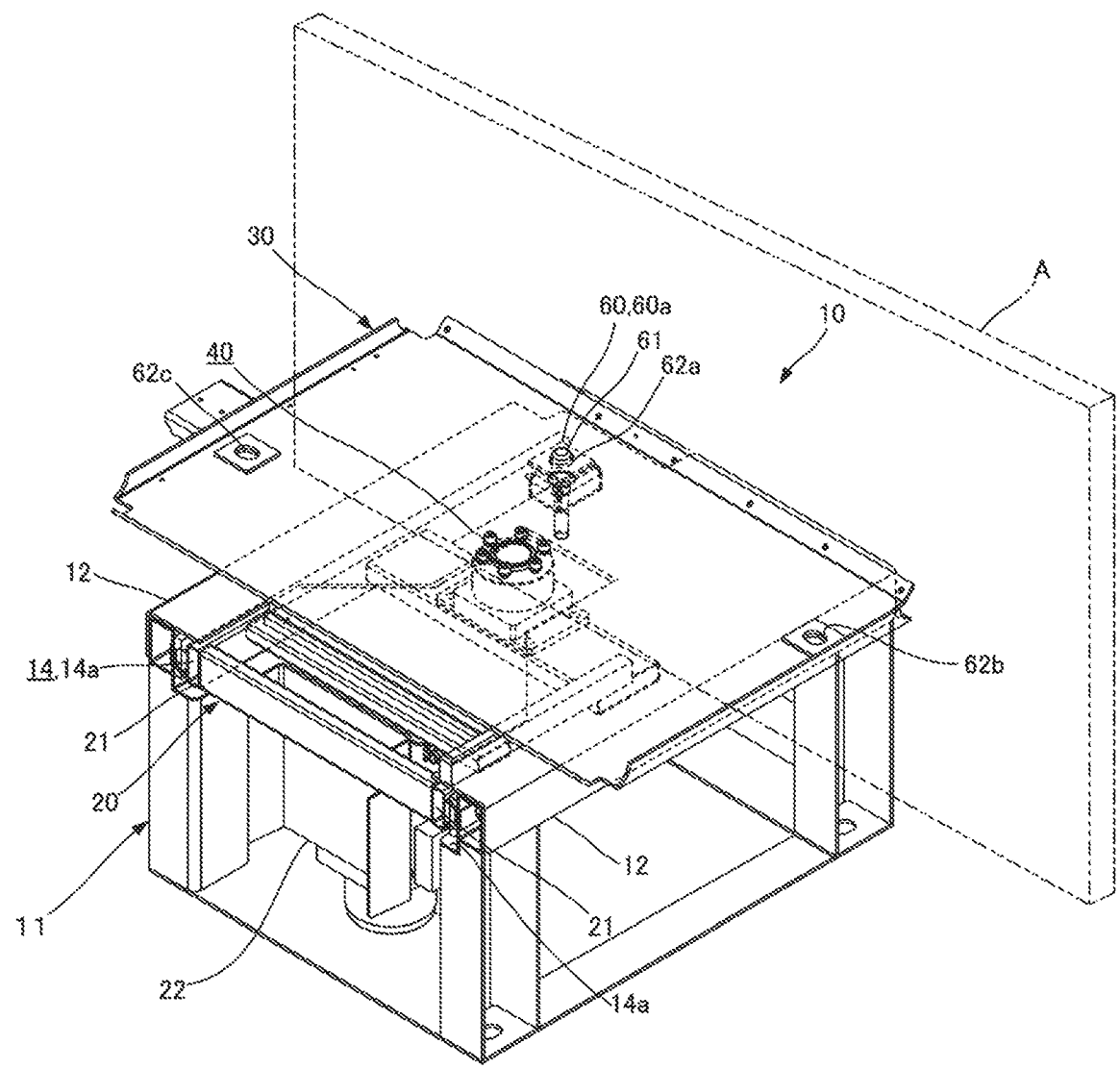
FIG. 6 is a perspective view showing a leg stand, a movable stand, and an underframe of the seat device according to the embodiment of the present invention.

As shown in FIG. 6, the seat device 10 includes a leg stand 11 fixed on a floor surface, a movable stand 20 supported by the leg stand 11 so as to be able to advance and retract in front and back directions, and the underframe 30 of the seat 1 supported by the movable stand 20 so as to be rotatable in forward and backward directions. Here, the leg stand 11 is "a fixed side of the seat 1", and the movable stand 20 and the underframe 30 are "a movable side of the seat 1". Note that the seat device 10 is arranged on the floor surface near a wall (window) in the cabin of the railroad car, and "A" in FIG. 6 is a part of the wall parallel to the moving direction of the railroad car.

In the seat device 10, the underframe 30 of the seat 1 is supported on the movable stand 20 to be rotatable about a rotation axis via the rotation mechanism 40. The movable stand 20 is supported on the leg stand 11 together with the rotation mechanism 40 via a sliding mechanism 14 so as to be able to advance and retract. Additionally, although an illustration is omitted, the seat device 10 includes an interlocking mechanism in order to interlock the rotation of the seat 1 by the rotation mechanism 40 with the advancement and retraction of the seat 1 by the sliding mechanism 14.

<Regarding Seat 1>

Figure 1:
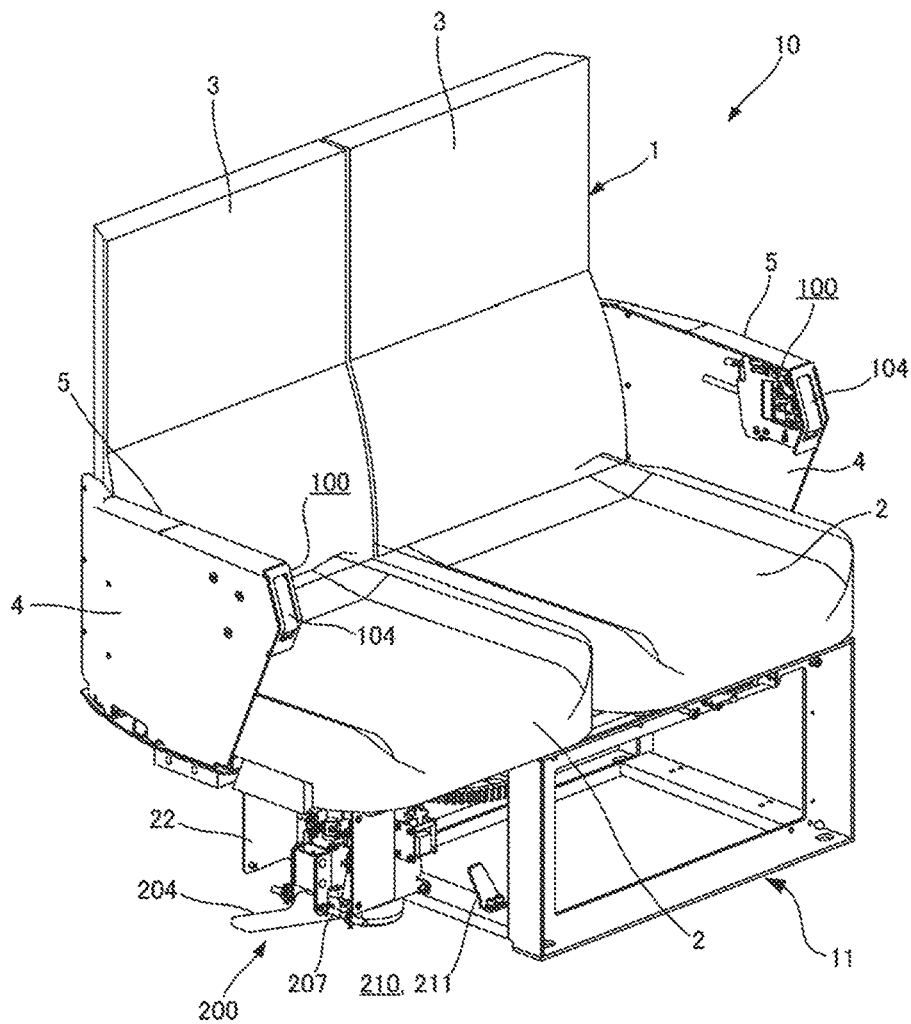
FIG. 1(a) is a perspective view of an entire seat.
FIG. 1(b) is an enlarged perspective view of a reclining operation unit.
FIG. 1(c) is an enlarged perspective view of a rotation operation unit, showing a cross state of a seat device according to an embodiment of the present invention.
Figure 1:
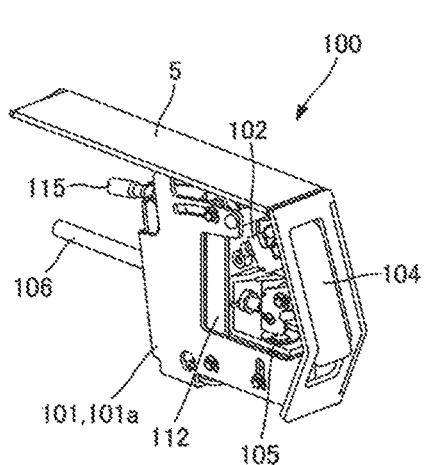
Figure 1:
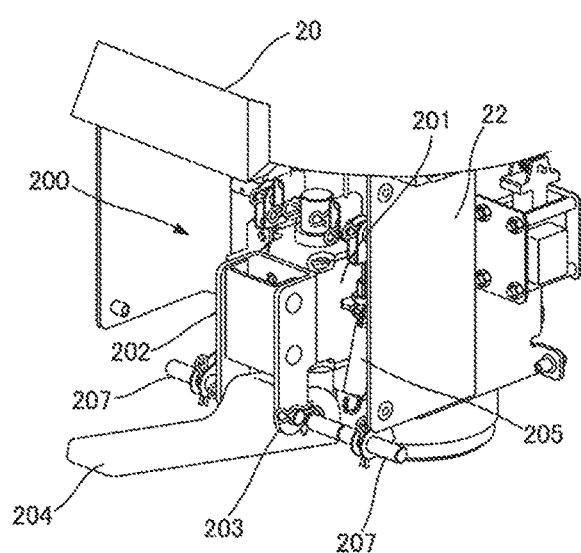

As shown in FIG. 1, the seat 1 is formed as a stool for two persons by arranging two seating portions 2 and backrests 3 side by side in both directions. A pair of sleeve portions 4 covering the seating portions 2 from the sides are provided on both sides of the seat 1. An upper end side of each sleeve portion 4 serves as an armrest 5 that extends substantially horizontally in front and back directions. A lower end side of the backrest 3 is supported at a rear end side of the seating portion 2 via a reclining mechanism 50 (refer to FIG. 3) in a tiltable manner.

<Reclining Mechanism 50>

Figure 3:
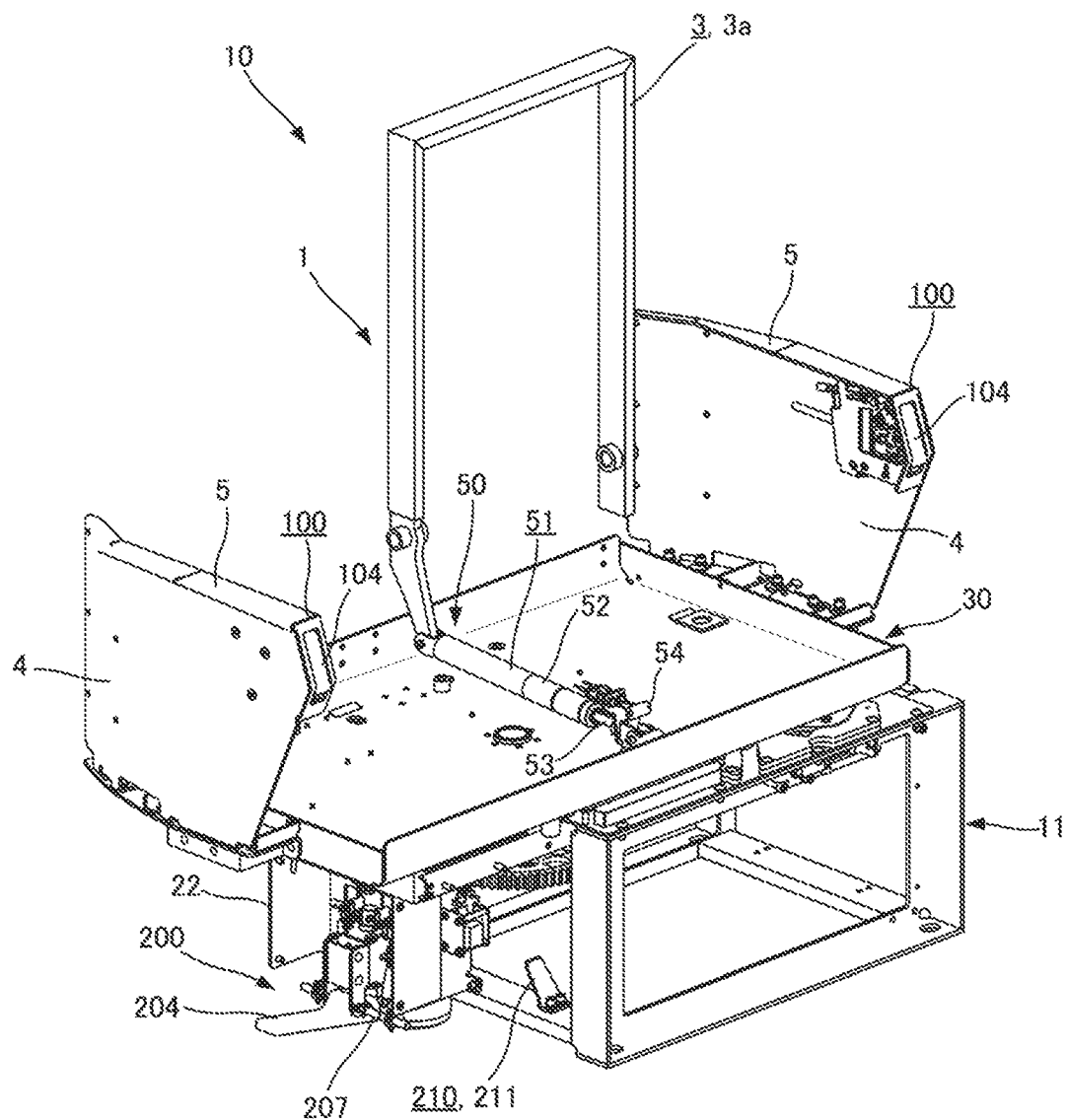
FIG. 3 is a perspective view showing an internal structure of the seat device according to the embodiment of the present invention.

As shown in FIG. 3, the reclining mechanism 50 supports the backrest 3 with respect to the seating portion 2 in a predetermined angular range in a tiltable manner. The reclining mechanism 50 includes, for example, a damper 51 such as a gas spring. The damper 51 is configured such that a piston rod 53 is inserted into its cylinder body 52 so as to be able to protrude, and is arranged on the underframe 30 to be parallel to the front and back directions. Although the damper 51 is urged in a direction in which the piston rod 53 is housed in the cylinder body 52, the piston rod 53 can be fixed in a state where only an arbitrary amount of the piston rod 53 is projected.

A rear end of the cylinder body 52 is connected to a lower end of a frame 3a of backrest 3 so as to be able to be pushed and pulled. On the other hand, a tip of the rod 53 that protrudes from a front end of the cylinder body 52 is connected to a proper place of a front end side of the underframe 30. With such a damper 51, the backrest 3 can be held at an arbitrary tilt angle. That is, when the damper 51 is a locked state, the piston rod 53 is fixed in a state where only a predetermined amount of the piston rod 53 is projected from the cylinder body 52, so that the backrest 3 can be held at an arbitrary tilt angle.

When the locked state of the damper 51 is released, the backrest 3 returns to a most upright initial position by the biasing force with which the piston rod 53 is housed in the cylinder body 52. When a seated person presses the backrest 3 backward against the restoring force of the damper 51 in this lock released state, the backrest 3 can be adjusted to an arbitrary tilt angle.

Although a detailed description of the lock mechanism of the damper 51 is omitted since the lock mechanism is common, a release button 54 for releasing the locked state is provided near the piston rod 53. A reclining operation unit 100 for pressing this release button 54 to release the locked state is provided in a front end of the armrest 5. Note that the reclining operation unit 100 corresponds to an "operation unit" of the present invention.

<Reclining Operation Unit 100>

As shown in FIG. 1, in the reclining operation unit 100, each component is incorporated and unitized in one housing 101, and is incorporated inside the front end of the armrest 5. The reclining operation unit 100 performs an operation (reclining operation) for tilting the backrest 3 by the reclining mechanism 50.

Figure 8:
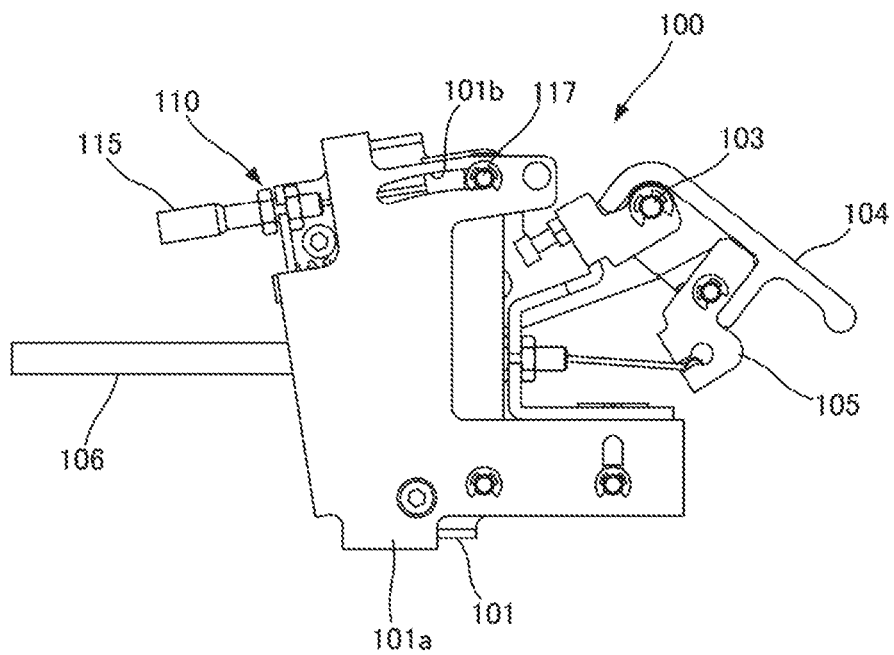
FIG. 8 is a side view showing an operation position of the reclining operation unit of the seat device according to the embodiment of the present invention.
Figure 9:
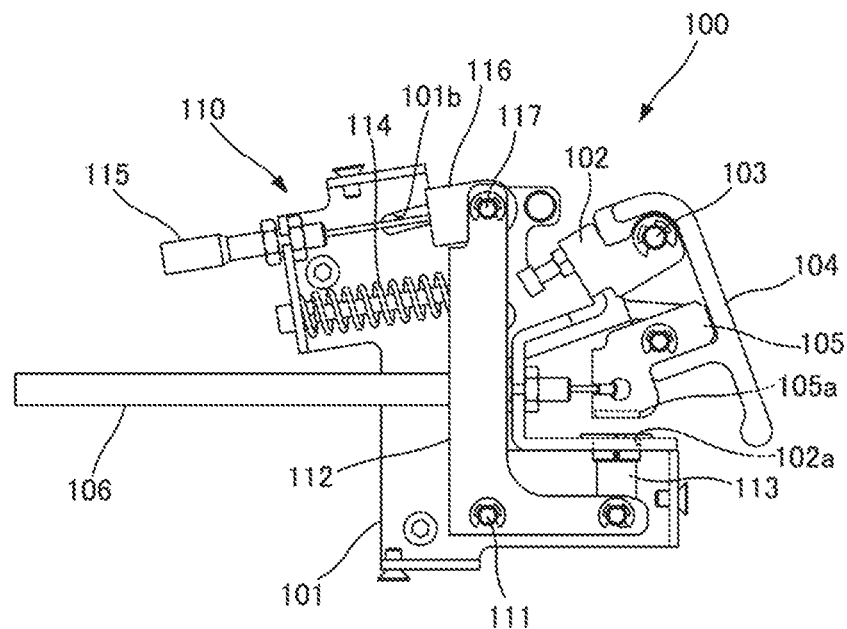
FIG. 9 is a side view showing an initial position of each part of the reclining operation unit of the seat device according to the embodiment of the present invention.
Figure 10:
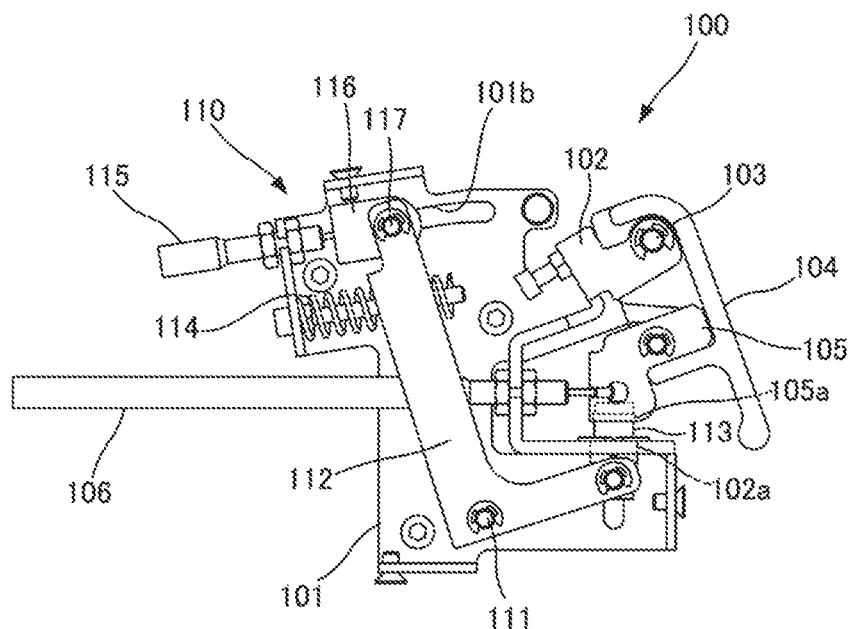
FIG. 10 is a side view showing a state where each part of the reclining operation unit of the seat device according to the embodiment of the present invention is restrained in the initial position to disable the operation.

As shown in FIG. 9 and FIG. 10, the rotation operation unit 100 includes an operation lever 104 that is swingably supported by a supporting bracket 102 fixed to the housing 101 via an axis 103. A lower end side of the operation lever 104 can be swung in front and back directions with the axis 103, to which an upper end side of the operation lever 104 is pivotably supported, being the swing center. The operation lever 104 is swung between an initial position (refer to FIG. 7) where the lower end side is housed in the housing 101, and an operation position (refer to FIG. 8) where the lower end side is pulled out forward.

A receiving member 105 of a reclining operation lock mechanism 110, which will be described next, is fixed to a back side of the operation lever 104. One end side of a reclining operation cable 106 extended to the release button 54 side is connected to the receiving member 105. Here, by pulling the operation lever 104 forward to the operation position, a link on the release button 54 side is pulled via the reclining operation cable 106 to push the release button 54, and the locked state of the damper 51 is released. Note that the operation lever 104 is normally urged backward to be housed at the initial position via the reclining operation cable 106.

<Reclining Operation Lock Mechanism 110>

Additionally, the reclining operation unit 100 is provided with the reclining operation lock mechanism 110 that can restrain the reclining operation unit 100 in an inoperable manner. The reclining operation lock mechanism 110 restrains the reclining operation unit 100 in an inoperable manner, when the seat 1 is in a long state (specific state), which will be described later. Note that the reclining operation lock mechanism 110 corresponds to a "lock mechanism" of the present invention.

As shown in FIG. 9, the reclining operation lock mechanism 110 includes a substantially L-shaped link 112 supported by the housing 101 via an axis 111 so as to be swingable in the front and back directions. In the link 112, a lock pin 113 is further supported upward in one end side from the axis 111. The lock pin 113 is disposed such that its upper end side penetrates through a guide hole 102a in the supporting bracket 102, and protrudes in up-and-down directions with the swing of the link 112.

The receiving member 105 on the back side of the operation lever 104 is provided with a lock hole 105a into which a tip of the lock pin 113 can protrude and fit, the lock hole 105a being provided at a lower location to which the lock pin 113 opposes when the operation lever 104 is in the initial position. Here, the link 112 that moves the lock pin 113 is normally urged by a spring member 114 in the clockwise direction around the axis 111 in FIG. 9, so as to be in a state where the lock pin 113 is disengaged from the lock hole 105a of the receiving member 105.

One end side of a reclining lock cable 115 is connected to the other end side of the link 112 from the axis 111 via a connector 116. The other end side of the reclining lock cable 115 is extended to a rotation operation unit 200 side, which will be described later. When the seat 1 is in the specific state (the long state, which will be described later), the reclining lock cable 115 restrains the reclining operation unit 100 in an inoperable manner by being pulled from the rotation operation unit 200 side.

That is, the reclining lock cable 115 swings the link 112 in the counter clockwise direction around the axis 111 in FIG. 9 and FIG. 10 by resisting the biasing force of the spring member 114. Accordingly, since the lock pin 113 fits into the lock hole 105a of the receiving member 105, the operation lever 104 is restrained in an inoperable manner. Note that the reclining lock cable 115 corresponds to "transmission means" of the present invention.

Figure 7:
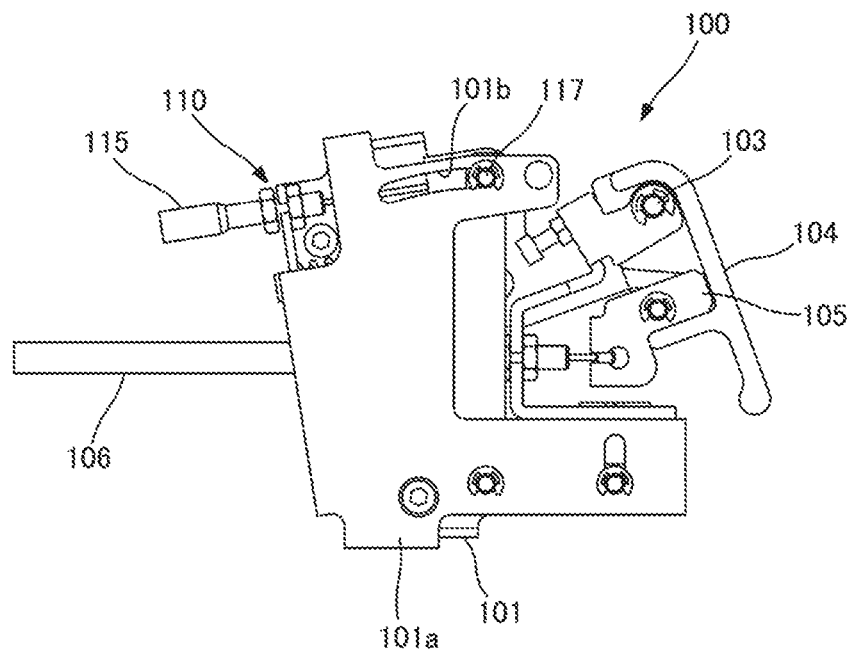
FIG. 7 is a side view showing an initial position of the reclining operation unit of the seat device according to the embodiment of the present invention.

As shown in FIG. 7 and FIG. 8, component parts of the reclining operation lock mechanism 110 arranged on the housing 101 are covered by a cover-like lid 101a. An arc-shaped guide groove 101b centered on the axis 111 of the link 112 is formed in the housing 101 and the lid 101a. An axis 117, which pivotably supports the connector 116 to the other end of the link 112, movably fits into the guide groove 101b, and a swing centered on the axis 111 of the link 112 is regulated.

<Regarding Orientation of Seat 1>

Figure 15:
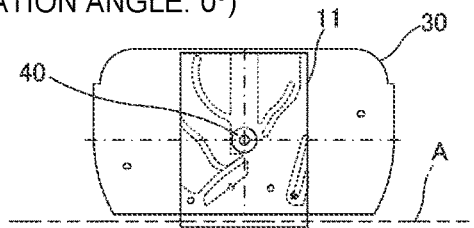
FIG. 15 is an explanatory diagram showing processes of converting the seat into the long state, one cross state, and a reverse cross state in the seat device according to the embodiment of the present invention.
Figure 15:
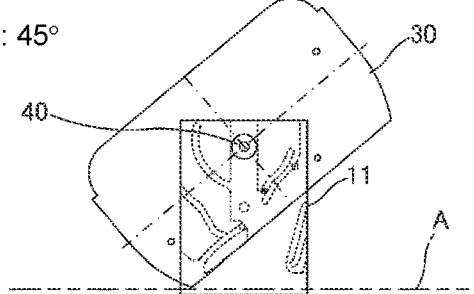
Figure 15:
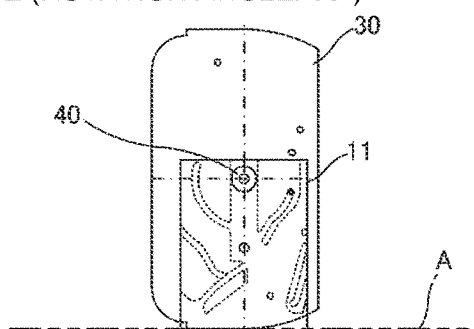
Figure 15:
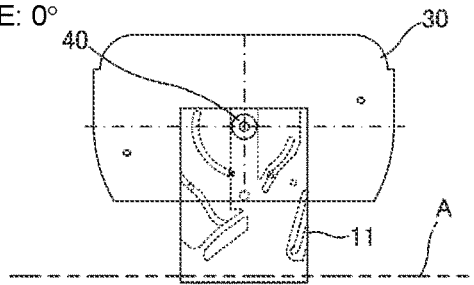
Figure 15:
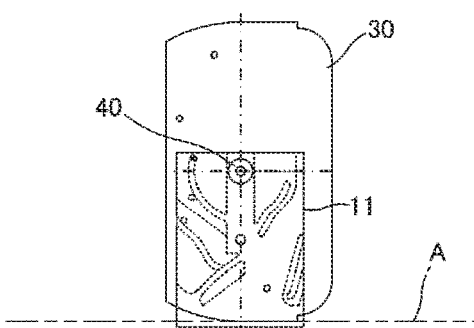

The seat device 10 can convert the state of the seat 1 between the long state (refer to FIG. 6, FIG. 2) in which the back of the seat is substantially parallel to and along a wall A, and a cross state (refer to FIG. 1) in which the back of the seat is substantially orthogonal to the wall A. Here, for the cross state, there are one cross state (refer to FIG. 1), and a reverse cross state that is 180 degrees in the opposite direction to the one cross state. As shown in FIG. 15, when it is assumed that the long state of the seat 1 has a rotation angle of 0 degrees as an original position, the rotation angle of the one cross state is 90 degrees, and the rotation angle of the reverse cross state is −90 degrees. Note that the back of the seat is synonymous with the back of the backrest 3. Hereinafter, when collectively referring to the one cross state and the reverse cross state, they are merely written as the cross state.

<Leg Stand 11>

As shown in FIG. 6, the leg stand 11 is fixed onto the floor surface near the wall A in the cabin. The leg stand 11 is formed by combining frame members into the shape of a stand that is long in the direction (front and back direction) substantially orthogonal to the wall A. Although an upper surface side of the leg stand 11 is substantially horizontal, and this upper surface side is surrounded by both side ends 12 and 12, forming the long sides, and a rear end portion, forming a short side on the rear side (wall A side), the front side (aisle side) is opened.

The leg stand 11 is arranged so that its rear end portion is close to and substantially parallel to the wall A, and both side ends 12 and 12 are substantially orthogonal to the wall A and extend toward the aisle side. Note that, in addition to the sliding mechanism 14, which will be described next, related parts such as a stopper for regulating the advance and retract range and the rotation direction of the underframe 30 are provided in the upper surface side of the leg stand 11.

<Sliding Mechanism 14>

As shown in FIG. 6, the movable stand 20 is attached to the upper surface side of the leg stand 11 via the sliding mechanism 14, so as to be able to advance and retract in the direction substantially orthogonal to the wall A. The sliding mechanism 14 includes a pair of guide rails 14a and 14a that are provided inside both side ends 12 and 12 of the leg stand 11. The pair of guide rails 14a and 14a are parallel to and oppose to each other along both the long sides of the upper surface of the leg stand 11, and both side portions 21 and 21 of the movable stand 20, which will be described next, directly and slidably fit inside the respective guide rails 14a.

<Movable Stand 20>

As shown in FIG. 6, the movable stand 20 is substantially horizontally arranged on the upper surface side of the leg stand 11, and is formed by combining frame members into a rectangular framework shape. Both side ends 21 and 21, forming the long sides of the movable stand 20, slidably fit inside the aforementioned pair of guide rails 14a and 14a. Thus, the movable stand 20 can be slid so as to advance or retract in the direction substantially orthogonal to the wall A. The rotation mechanism 40 that rotates the seat 1 about the rotation axis is provided at a substantially center of the movable stand 20.

<Rotation Mechanism 40>

The rotation mechanism 40 supports the underframe 30 of the seat 1 on the movable stand 20 so as to be rotatable in the forward and backward directions in a substantially horizontal surface. The rotation mechanism 40 is formed as a unit in which, for example, a pair of inner and outer ring-shaped turntables are rotatably combined with each other by interposing a bearing, etc. between them. In this rotation mechanism 40, the outer turntable is fixed to the moving table 20, and the inner turntable is fixed to the underframe 30.

Figure 4:
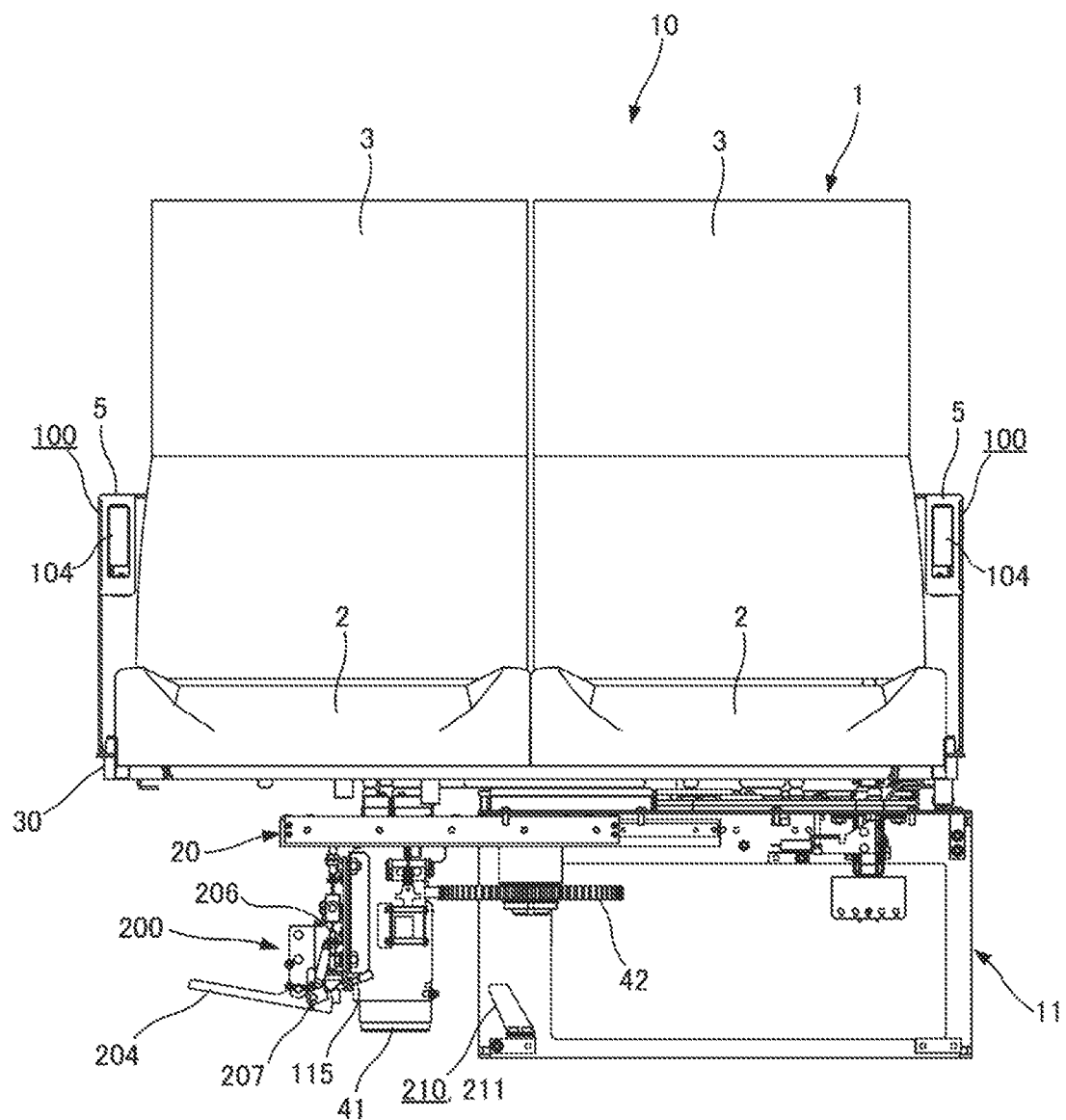
FIG. 4 is a front view showing the cross state of the seat device according to the embodiment of the present invention.
Figure 5:
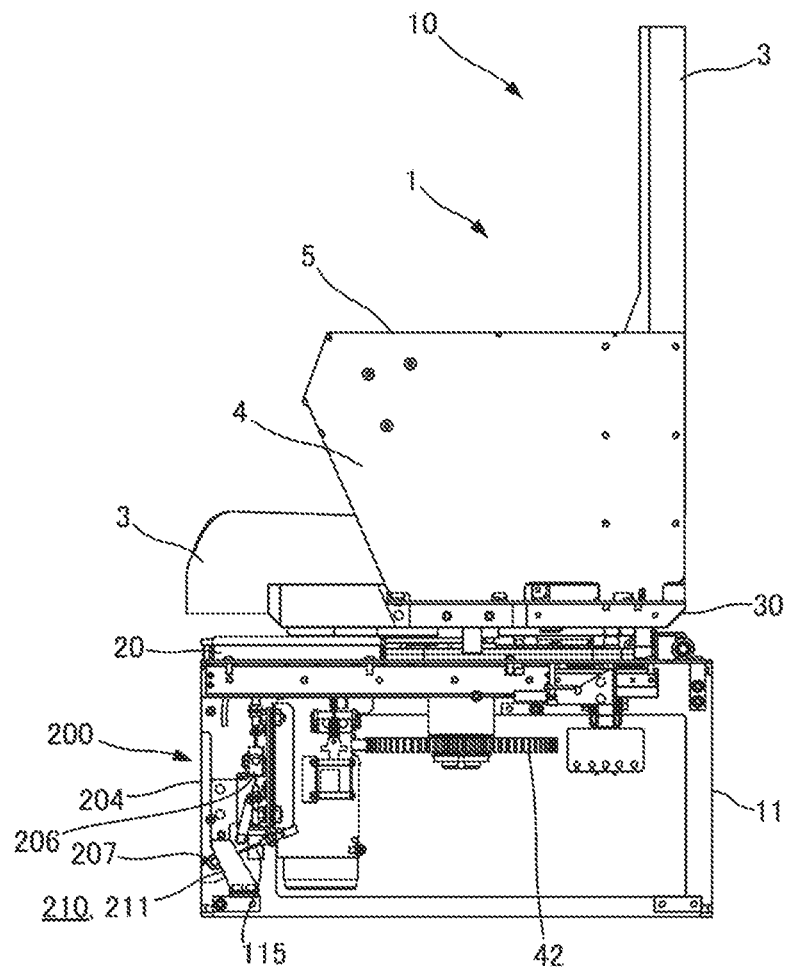
FIG. 5 is a side view showing the long state of the seat device according to the embodiment of the present invention.

The rotation axis, which serves as the rotation center of the seat 1, is the center line of the rotation mechanism 40, and does not have a physical substance in the present embodiment. As shown in FIG. 4, the rotation mechanism 40 includes a motor 41, which is a power source. The motor 41 is provided with a reducer, and a drive gear in its output axis is rotatably engaged with a sprocket 42 centered on the rotation axis provided in the underframe 30 side. Note that the rotation mechanism 40 also allows the seat to be manually rotated.

<Underframe 30>

As shown in FIG. 6, the seat 1 is attached to the underframe 30, and the underframe 30 is supported by the rotation mechanism 40 on the movable stand 20. The underframe 30 is formed by, for example, a metal plate that corresponds to a bottom surface of the seating portion 2. Although described above, the sprocket 42 with which the drive gear of the motor 41 rotatably engages is integrally provided in the bottom surface side of the underframe 30.

<Interlocking Mechanism>

Additionally, the seat device 10 includes an interlocking mechanism (not shown) that interlocks the rotation and advancement and retraction of the seat 1, so that the seat 1 does not interfere with the wall A, when converting the seat 1 to the long state, the one cross state, and the reverse cross state.

When the seat 1 is rotated with the underframe 30, the interlocking mechanism converts the rotation of the underframe 30 into linear motion, transmits the linear motion to the movable stand 20, and makes the movable stand 20 move in a linear direction so as to be close to or separated from the wall A together with the underframe 30. Although the kind of such an interlocking mechanism is not particularly limited, specifically, for example, the invention already proposed by the present applicant and described in Japanese Patent Laid-Open No. 2018-187971 may be utilized, or, although not published, the invention proposed in Japanese Patent Application No. 2019-239066, etc. may be utilized.

<Rotation Lock Mechanism 60>

The seat device 10 includes a rotation lock mechanism 60 that unrotatably restrains the underframe 30 (seat) in each rotation position of the long state, the one cross state, and the reverse cross state. Since the rotation lock mechanism 60 unrotatably locks the underframe 30 to the leg stand 11, the movable stand 20 is also inevitably restrained to the leg stand 11 so as not to be able to advance and retract.

As shown in FIG. 6, the rotation lock mechanism 60 includes a lock pin 61 that can protrude up and down from the leg stand 11 side to the underframe 30, and locking holes 62a, 62b, and 62c that are provided in the underframe 30, and with and from which the lock pin 61 are engaged and released. A total of three locking holes 62a, 62b, and 62c are provided in a long side along the back of the seat, and both short sides along the seat of the substantially rectangular underframes 30, respectively.

The lock pin 61 is incorporated in a unit 60a, and the unit 60a is fixed near the rear end of the upper surface side of the leg stand 11. The lock pin 61 is operated between a lock position at which the lock pin 61 can protrude upward from the upper surface side of the leg stand 11 to project upward and fit into the locking holes 62a, 62b, and 62c, and a lock release position at which the lock pin 61 retracts downward to be released from the locking holes 62a, 62b, and 62c.

When the seat 1 is converted into the long state, the one cross state, and the reverse cross state, the lock pin 61 unrotatably restrains the seat 1 by fitting into the locking holes 62a, 62b, and 62c on the underframe 30 side to which the lock pin 61 vertically corresponds at the respective positions. That is, in the long state, the lock pin 61 fits into the locking hole 62a in one long side of the underframe 30. Additionally, in the one cross state, the lock pin 61 is inserted into and engaged with the locking hole 62b in one short side of the underframe 30. Furthermore, in the reverse cross state, the lock pin 61 fits into the locking hole 62c in the other short side of the underframe 30.

Figure 13:
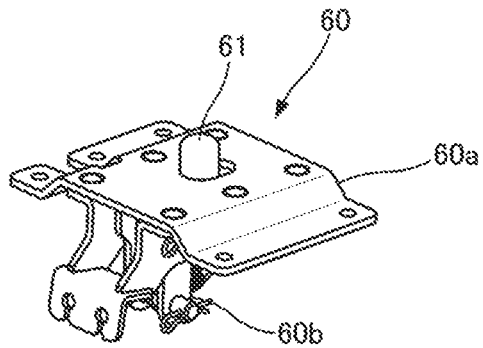
FIG. 13 is a perspective view showing a rotation lock mechanism of the seat device according to the embodiment of the present invention.
Figure 14:
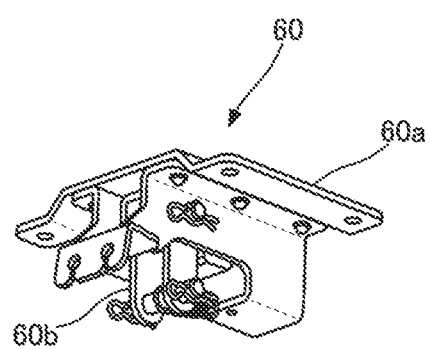
FIG. 14 is a perspective view showing a state where the rotation lock mechanism of the seat device according to the embodiment of the present invention is seen from the bottom.

As shown in FIG. 13 and FIG. 14, the unit 60a in which the lock pin 61 is incorporated is provided with each of a spring member (not shown) that always urges the lock pin 61 to project upward to the lock position, and a link 60b that makes the lock pin 61 resist the biasing force of the spring member to retract to the downward lock release position.

The lock pin 61 is configured to be normally maintained in the lock position by the biasing force of the spring member, but to retract in the lock release position against the biasing force of the spring member, when the link 60b is pulled by each operating cable. Here, the other end side of the operating cable for manual operation is extended to the rotation operation unit 200 provided in the leg stand 11 side. Although described later, when the operating cable 206 (refer to FIG. 11) is pulled by an operation in the rotation operation unit 200, the restraint of the rotation lock mechanism 60 is released.

On the other hand, for example, the motor 41 of the rotation mechanism 40 also serves as the power source for pulling the operating cable for electric operation. That is, the motor 41 includes a clutch, and is configured to be able to switch between an operation for rotating the seat by the rotation mechanism 40, and an operation for retracting the lock pin 61 to release the lock, by switching of the clutch. Note that a detailed description of the clutch of the motor 41 is omitted, since the configuration regarding the clutch of the motor 41 is common.

The rotation lock mechanism 60 according to the present embodiment is configured such that, when the seat 1 is in the long state, the restraint by the rotation lock mechanism 60 cannot be released by a manual operation in the rotation operation unit 200, and can be released only by an electric operation by the motor 41. Here, the electric operation is performed by a crew or station employee of a vehicle, and the manual operation is mainly performed by a passenger.

<Rotation Operation Unit 200>

Additionally, the rotation lock mechanism 60 is provided with the rotation operation unit 200 for performing a release operation of the restraint by the lock pin 61. As shown in FIG. 1, the rotation operation unit 200 is unitized by incorporating each part in one housing 201, and is fixed to an attaching portion 22 (refer to FIG. 6) hanging from the front end side of the movable stand 20.

Figure 2:
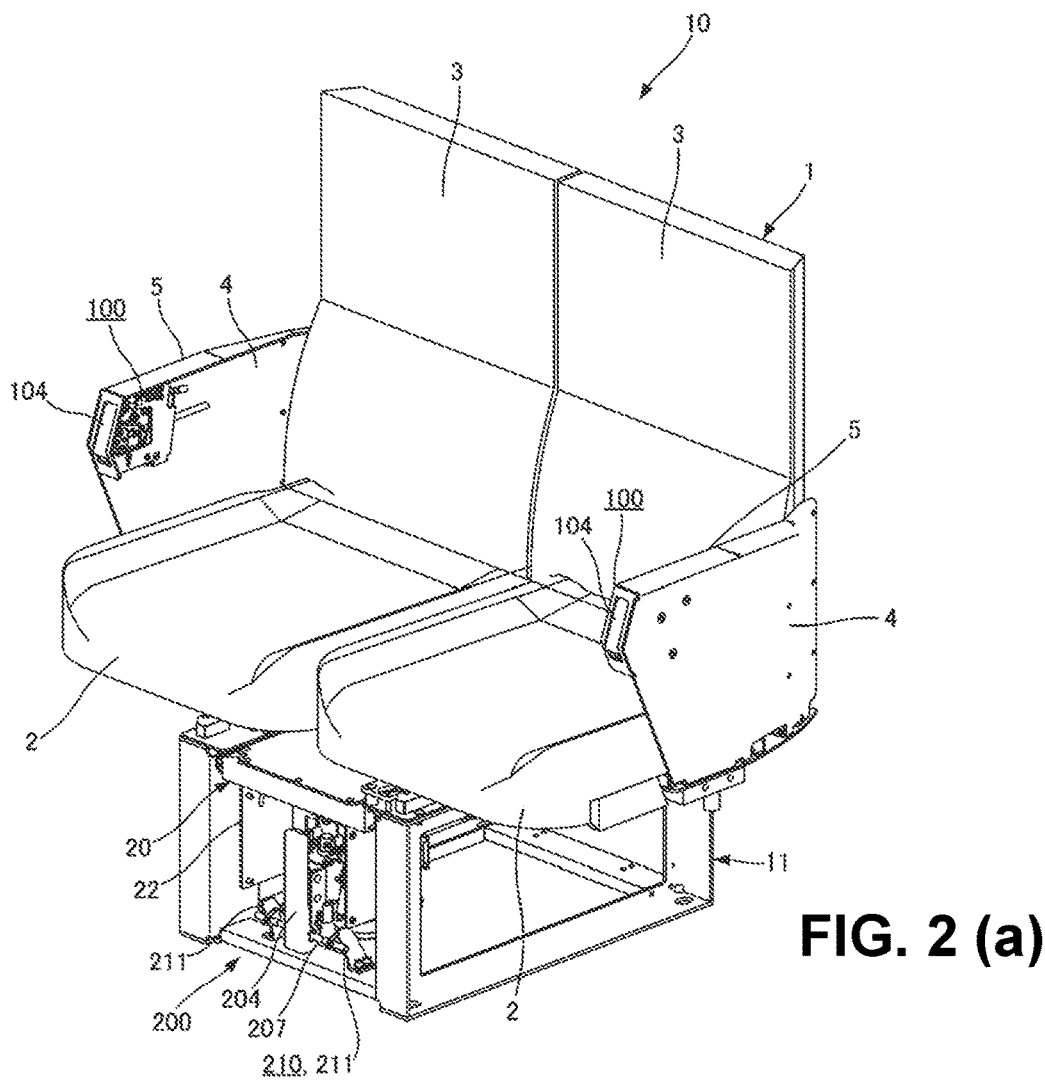
FIG. 2(a) is a perspective view of the entire seat.
FIG. 2(b) is an enlarged perspective view of the reclining operation unit.
FIG. 2(c) is an enlarged perspective view of the rotation operation unit, showing a long state of the seat device according to the embodiment of the present invention.
Figure 2:
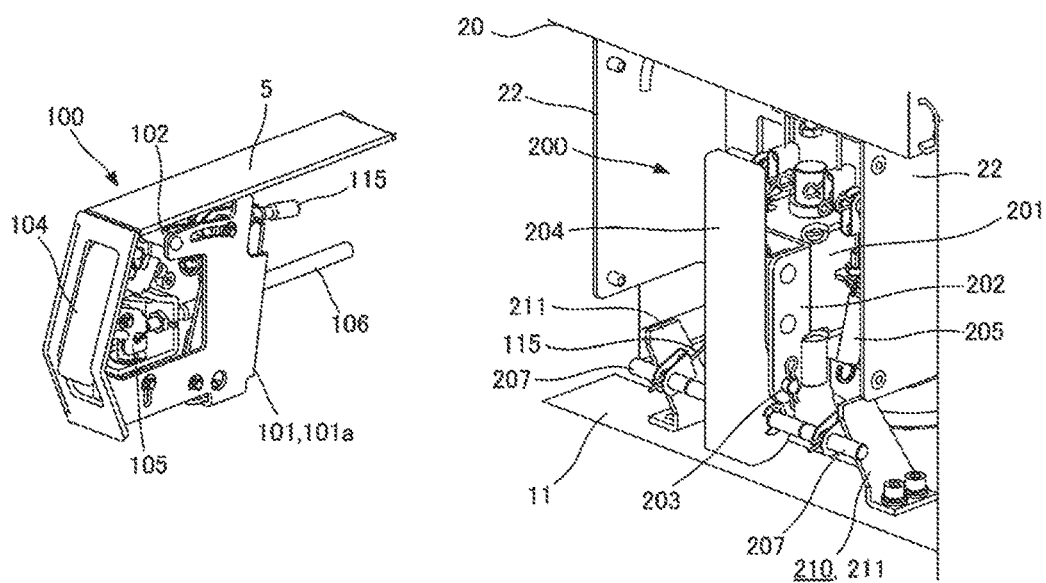
Figure 11:
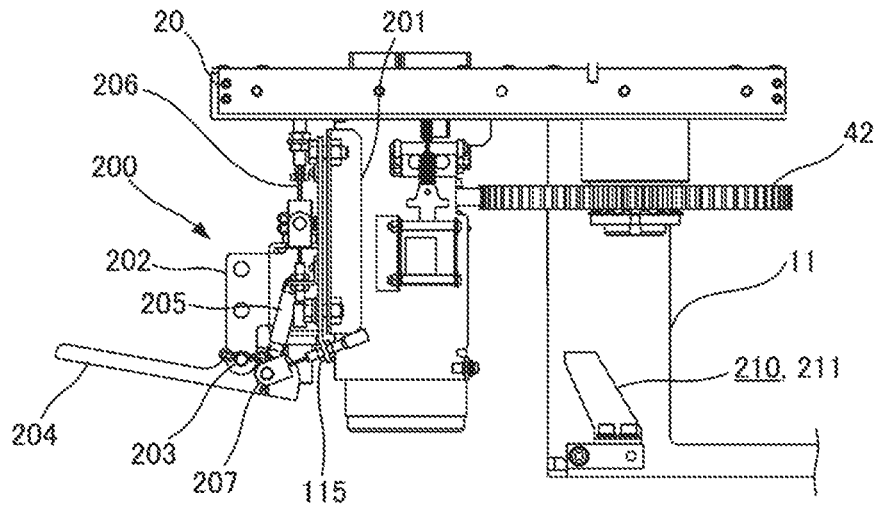
FIG. 11 is a side view showing a state where the rotation operation unit of the seat device according to the embodiment of the present invention is not restrained to disable the operation by the rotation operation prevention mechanism.
Figure 12:
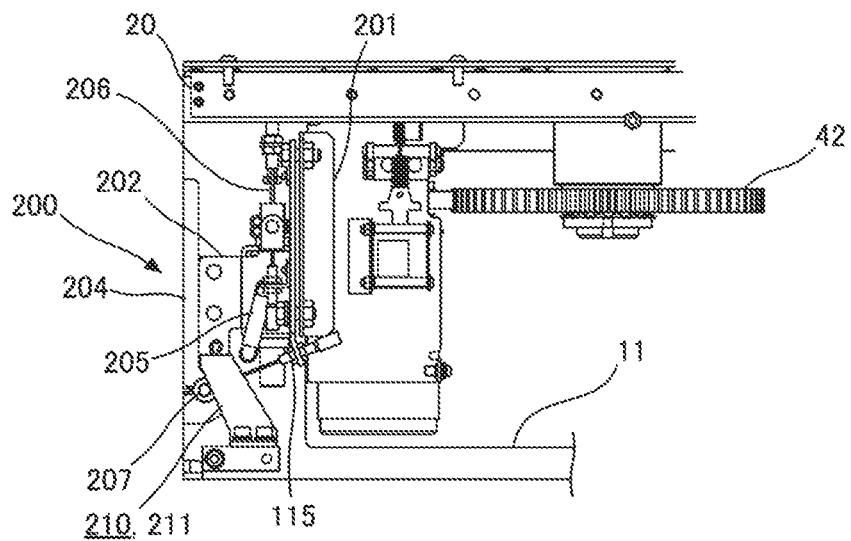
FIG. 12 is a side view showing a state where the rotation operation unit of the seat device according to the embodiment of the present invention is restrained to disable the operation by the rotation operation prevention mechanism.

As shown in FIG. 1(*a*), FIG. 2(*a*), FIG. 11, and FIG. 12, the rotation operation unit 200 includes a step pedal 204 swingably supported by a lower end of a supporting bracket 202 fixed to the front surface side of the housing 201 via an axis 203. A tip side of the step pedal 204 can be swung in the front and back directions, with the axis 203, to which its base end side is pivotably supported, being the swing center. Note that the step pedal 204 corresponds to a "pedal" of the present invention.

The step pedal 204 is swung between a using position (refer to FIG. 11) at which the tip side protrudes forward of the housing 201, and a housing position (refer to FIG. 12) at which the tip side withdraws upward. The step pedal 204 is normally urged to protrude forward to be in the using position via the spring member 205. Here, when the step pedal 204 is in the using position, an operation of stepping on this to release the restraint by the rotation lock mechanism 60 is enabled, but when the step pedal 204 is in the housing position, the operation of releasing the restraint by the rotation lock mechanism 60 is disabled. Note that the spring member 205 corresponds to "biasing means" of the present invention.

The base end side of the step pedal 204 is connected to the other end side of the operating cable 206 for manual operation extended to the rotation lock mechanism 60 side via a connector. Here, when the step pedal 204 in the using position is stepped downward, the operating cable 206 is pulled and the lock pin 61 (refer to FIG. 13) is retracted downward, and the locked state of the rotation lock mechanism 60 is released.

Additionally, a pin-shaped engaged portion 207 projecting in both directions at a position eccentric from the axis 203 is fixed to the base end side of the step pedal 204. The engaged portion 207 is connected to the other end side of the reclining lock cable 115 extending from the reclining operation lock mechanism 110 side via a connector. Here, when the engaged portion 207 is engaged with an engaging portion 211, which will be described next, the reclining lock cable 115 is pulled, and the lock pin 113 of the reclining operation lock mechanism 110 projects upward, and the reclining operation unit 100 is restrained to disable the operation.

<Rotation Operation Blocking Mechanism 210>

Additionally, the rotation operation unit 200 is provided with a rotation operation prevention mechanism 210 that disables the release operation of the restraint by the rotation operation unit 200. The rotation operation prevention mechanism 210 disables the operation of the step pedal 204 when the seat 1 is in the long state. The long state here corresponds to "the seat 1 is in the specific state" in the present invention.

As shown in FIG. 11 and FIG. 12, the rotation operation prevention mechanism 210 includes the engaging portion 211 provided in the leg stand 11, which is the fixed side of the seat 1, and the engaged portion 207 provided in the rotation operation unit 200 in the movable side of the seat 1. The engaging portion 211 is arranged in the front end of the bottom surface side of the leg stand 11, and is formed in a bracket shape that protrudes diagonally upward toward the front.

The engaged portion 207 is provided in the pin shape at the position eccentric from the axis 203 in the base end side of the step pedal 204 as described above. This engaged portion 207 is set to precisely engage with the engaging portion 211 when the seat 1 in the long state (specific state). Since the step pedal 204 is swung to be in the housing position against the biasing force of the spring member 205 when the engaged portion 207 is engaged with the engaging portion 211, the release operation in the rotation operation unit 200 is disabled. At the same time, the reclining operation unit 100 is restrained to disable the operation.

<Operation of Seat Device 10>

Hereinafter, based on FIG. 15, the operation of converting the state of the seat 1 will be described. First, as shown in FIG. 15(a), when the underframe 30 (seat 1) is in the long state, the rotation axis (rotation mechanism 40) of the underframe 30 is most retracted (close) to the wall A side. Here, the long side of the underframe 30 (the back of the seat) is substantially parallel to and along the wall A, and the rotation angle is 0 degrees.

<<Restraint of Rotation Operation of Seat 1>>

When the seat 1 is in the long state, the underframe 30 is restrained to disable the rotation with respect to the movable stand 20 by the rotation lock mechanism 60. That is, as shown in FIG. 6, the lock pin 61 of the rotation lock mechanism 60 fits into the locking hole 62a in the one long side of the underframe 30. Here, since the lock pin 61 protrudes from the leg stand 11, which is the fixed side of the seat 1, the seat 1 is not only restrained to disable the rotation, but also simultaneously restrained to disable advancement and retraction.

As shown in FIG. 2, when the seat 1 is in the long state, the release operation in the rotation operation unit 200 is disabled by the rotation operation prevention mechanism 210. That is, in the long state, the movable stand 20 is most retracted (close) to the wall A side, and the front end side of the movable stand 20 overlaps with the front end side of the leg stand 11. With this positional relationship, as shown in FIG. 2(c), the engaged portion 207 of the step pedal 204 in the movable stand 20 is engaged with the engaging portion 211 in the leg stand 11. Then, the step pedal 204 is swung to be in the housing position at which the step pedal 204 is upright against the biasing force of the spring member 205, and is restrained in the housing position.

Accordingly, when the seat 1 is in the long state, the step pedal 204 is not only displaced to the housing position at which the operation is disabled, but also firmly held in the housing position by the engagement relationship between the engaging portion 211 and the engaged portion 207. Thus, in the long state, the release operation in the rotation operation unit 200 is disabled. With such a simple configuration, the rotation operation of the seat 1 by a seated person can be reliably prevented in the long state.

<<Restraint of Reclining Operation of Backrest 3>>

Additionally, when the seat 1 is in the long state, the reclining operation in the reclining operation unit 100 is disabled by the reclining operation lock mechanism 110. To be more specific, when the step pedal 204 is swung upward by the engagement of the engaged portion 207 to the engaging portion 211, the reclining lock cable 115 connected to the engaged portion 207 is pulled, and the reclining operation unit 100 is restrained to disable the operation.

That is, as shown in FIG. 10, when the reclining lock cable 115 is pulled, the link 112 is swung in the counter clockwise direction around the axis 111 in FIG. 10 against the biasing force of the spring member 114. Then, the lock pin 113 in the one end side of the link 112 projects upward to fit into the lock hole 105a in the receiving member 105 integrated with the operation lever 104 in the initial position.

Accordingly, when the seat 1 is in the long state, the reclining operation by the reclining operation unit 100 is disabled, and the backrest 3 cannot be tilted by the reclining mechanism 50. With such a simple configuration, in the long state, the reclining operation of the backrest 3 by a seated person can be reliably prevented, and the backrest 3 can be prevented from being carelessly tilted to interfere with the wall A.

<<Conversion from Long State to One Cross State>>

As shown in FIG. 15(a) to FIG. 15(c), in order to convert the underframe 30 (seat 1) into the one cross state from the long state (the rotation angle 90 degrees), first, it is necessary to release the restraint of the rotation by the rotation lock mechanism 60. Here, the operation of disengaging the lock pin 61 from the locking hole 62a cannot be performed by the operation of the step pedal 204 as described above, and is performed by the electric operation utilizing the power of the motor 41.

In the long state shown in FIG. 15(a), when the underframe 30 is rotated by the motor 41 to the forward direction (the counter clockwise direction in FIG. 15) as shown in FIG. 15(b) after releasing the restraint by the rotation lock mechanism 60, the underframe 30 is rotated while moving forward by interlocking mechanism. That is, the underframe 30 is rotated while being rotated in the forward direction and moving forward to the aisle side, so as not to interfere with the wall A.

As shown in FIG. 15(c), when the underframe 30 reaches the one cross state (the rotation angle 90 degrees), in FIG. 6, the lock pin 61 of the rotation lock mechanism 60 fits into the locking hole 62b in the one short side of the underframe 30. Accordingly, the underframe 30 (seat 1) is unrotatably restrained in the one cross state.

<<Release of Restriction of Rotation Operation of Seat 1>>

When the seat 1 is in the cross state, the restraint to disable the operation of the rotation operation unit 200 by the rotation operation prevention mechanism 210 is released.

That is, in the cross state shown in FIG. 15(c), the movable stand 20 is most advanced (separated) from the wall A side, and the front end side of the movable stand 20 is located farther forward from the front end side of the leg stand 11. In this positional relationship, as shown in FIG. 11, the engaged portion 207 of the step pedal 204 in the movable stand 20 is not engaged with and separated from the engaging portion 211 in the leg stand 11. Thus, the step pedal 204 protrudes forward to be in the using position by the biasing force of the spring member 205.

At this time, the seated person of the seat 1 can release the restraint by the rotation lock mechanism 60 by stepping on the step pedal 204. That is, in FIG. 11, when the step pedal 204 is stepped on to be swung, the operating cable 206 is pulled, the lock pin 61 (refer to FIG. 13) is retracted downward, and the locked state of the rotation lock mechanism 60 is released. Accordingly, the seated person can manually rotate the seat 1.

<<Release of Restriction of Reclining Operation of Backrest 3>>

Additionally, when the seat 1 is in the cross state, the restraint to disable the operation of the reclining operation unit 100 by the reclining operation lock mechanism 110 is also released. That is, as described above, in the cross state, as shown in FIG. 11, the engaged portion 207 of the step pedal 204 in the movable stand 20 is not engaged with and separated from the engaging portion 211 in the leg stand 11. Thus, the step pedal 204 protrudes forward to be in the using position by the biasing force of the spring member 205, and the reclining lock cable 115 is in a state where the reclining lock cable 115 is not pulled.

Accordingly, as shown in FIG. 9, in the reclining operation lock mechanism 110, the link 112 is in a state where the lock pin 113 is not made to project upward, by the biasing force of the spring member 114. Thus, the lock pin 113 has come out of the lock hole 105a in the receiving member 105 integrated with the operation lever 104, and the restraint to disable the operation of the operation lever 104 is released to enable the reclining operation. Therefore, the seated person can tilt the backrest 3 to an arbitrary angle by the reclining mechanism 50, and can improve seating comfort.

<<Conversion from One Cross State to Reverse Cross State>>

In the one cross state shown in FIG. 15(c), when the underframe 30 is rotated to the backward direction (the clockwise direction in FIG. 15) after the restraint of the rotation lock mechanism 60 is released, the underframe 30 advances or retracts while, for example, being rotated by the interlocking mechanism, whose illustration is omitted. Subsequently, as shown in FIG. 15(d), in a state where the underframe 30 is temporarily held at the position to which the underframe 30 has advanced in a state parallel to the long state, the underframe 30 is directly rotated to the opposite direction without advancing and retracting.

As shown in FIG. 15(e), when the underframe 30 reaches the reverse cross state (the rotation angle −90 degrees), the lock pin 61 of the rotation lock mechanism 60 fits into the locking hole 62c in the other short side of the underframe 30, and the underframe 30 is restrained again to disable the rotation. Such conversion of the seat 1 into the reverse cross state from the one cross state can be performed by not only the manual operation, but also by the electric operation. Note that, in order to return the seat 1 from the reverse cross state to the one cross state, and further from the one cross state to the original long state, the inverse operations of the aforementioned conversion from the long state to the one cross state, and from the one cross state to the reverse cross state may be performed, respectively.

<Configuration and Effects of Present Invention>

Although the embodiment of the present invention has been described above, the present invention is not limited to the aforementioned embodiment. The present invention derived from the aforementioned embodiment will be described below.

First, in the present invention,
the seat device 10 that can convert the state of the seat 1 includes
the reclining mechanism 50 that can tilt the backrest 3 of the seat 1,
wherein the operation of tilting the backrest 3 by the reclining mechanism 50 is disabled when the seat 1 is in the specific state.

In the present seat device 10, the seat 1 is arranged along the wall A, and the aisle width is expanded as much as possible in the cabin. Thus, when the seat 1 is in the long state, although the backrest 3 is close to the wall A, when the seat 1 is in such a specific state, tilting of the backrest 3 by the reclining mechanism 50 can be reliably regulated.

Accordingly, it is possible to prevent the backrest 3 from being accidentally tilted and interfering with the wall A. When rotation and sliding are interlocked in a conventional seat, the reclining mechanism 50 cannot be uniformly provided to prevent interference with the wall A in the long state. On the other hand, the present seat device 10 includes the reclining mechanism 50, enables the backrest 3 to be tilted when in the cross state, and can improve seating comfort.

Additionally, the present invention includes
the operation part 100 that performs the operation of tilting the backrest 3 by the reclining mechanism 50, and
the lock mechanism 110 that can restrain the operation part 100 in an inoperable manner,
wherein the lock mechanism 110 restrains the operation part 100 in an inoperable manner when the seat 1 is in the specific state.

In this manner, the present seat device 10 restrains the operation part 100 that performs the operation of the reclining mechanism 50 in an inoperable manner by the lock mechanism 110. Therefore, when the seat 1 is in the long state, the reclining operation itself by a seated person cannot be performed, and the tilting of the backrest 3 can be regulated in a manner that is easily understood by the seated person.

Additionally, the present invention includes
the engaging portion 211 provided in the fixed side of the seat 1, and
the engaged portion 207 that is provided in the movable side of the seat 1, and can be displaced by being engaged with the engaging portion 211 when the seat 1 is in the specific state,
wherein the engaged portion 207 and the lock mechanism 110 are connected to each other via the transmission means 115, displacement of the engaged portion 207 is transmitted to the lock mechanism 110 via the transmission means 115, and the lock mechanism 110 restrains the operation part 100 in an inoperable manner.

In this manner, according to the present seat device 10, since the reclining operation is regulated due to the mechanical engagement relationship between the engaging portion 211 and the engaged portion 207, it is possible to restrain the operation part 100 in an inoperable manner only in the long state, which is the specific state of the seat 1, with a simple configuration, and without using electric power.

Additionally, in the present invention, the operation part 100 can be displaced from the ordinary initial position to the using position at the time of operation, the lock mechanism 110 includes the lock pin 113 that can be engaged with and released from the operation part 100 in the initial position, and the lock pin 113 is engaged with the operation part 100 via the transmission means 115 by displacement of the engaged portion 207, and restrains the operation part 100 in an inoperable manner.

In this manner, in the present seat device 10, the displacement of the operation part 100 that causes the reclining operation can be easily prevented by directly engaging and releasing the lock pin 113 having a simple configuration with and from the operation part 100.

Furthermore, the present invention includes the rotation mechanism 40 that rotates the seat 1 about the rotation axis, and the sliding mechanism 14 that advances and retracts the seat 1 together with the rotation mechanism 40 from the fixed side, wherein the state of the seat 1 can be converted by interlocking of the rotation mechanism 40 and the sliding mechanism 14 between the long state where the back of the seat is substantially parallel to and along the wall A, and the cross state where the back of the seat is separated from the wall A in the direction substantially orthogonal to the long state, and the specific state of the seat 1 corresponds to the long state.

Accordingly, as described in the above embodiment, it becomes possible to directly apply the present seat device 10 to general rotary seats mounted in railroad cars.

Although the embodiments have been described above with the drawings, the specific configuration is not limited to these embodiments, and even when there are modification and addition in the scope not departing from the gist of the present invention, they are included in the present invention.

For example, the shapes of the leg stand 11, the movable stand 20, and the underframe 30 are not limited to those shown. Additionally, although the example of the seat 1 for two persons has been described, the seat 1 may be for three persons or one person. In addition, the conversion of the state of the seat is not limited to the long state, the one cross state, and the reverse cross state.

INDUSTRIAL APPLICABILITY

The present invention can be widely utilized as a seat device for chairs for theaters, home, and office, in addition to the seat 1 for vehicles installed in cabins of railroad cars, airplanes, automobiles, marine vessels, etc.

REFERENCE SIGNS LIST

10 . . . Seat device
11 . . . Leg stand
14 . . . Sliding mechanism
20 . . . Movable stand
30 . . . Underframe
40 . . . Rotation mechanism
50 . . . Reclining mechanism
60 . . . Rotation lock mechanism
100 . . . Reclining operation unit
104 . . . Operation lever
105 . . . Receiving member
110 . . . Reclining operation lock mechanism
113 . . . Lock pin
200 . . . Rotation operation unit
204 . . . Step pedal
207 . . . Engaged portion
210 . . . Rotation operation prevention mechanism
211 . . . Engaging portion

What is claimed is:

1. A seat device that can convert a state of a seat, comprising:

a reclining mechanism that can tilt a backrest of the seat;

an operation part that performs an operation of tilting the backrest by the reclining mechanism;

a lock mechanism that can restrain the operation part in an inoperable manner;

an engaging portion provided in a fixed side of the seat; and an engaged portion that is provided in a movable side of the seat, and can be displaced by being engaged with the engaging portion when the seat is in a specific state, wherein an operation of tilting the backrest by the reclining mechanism is disabled when the seat is in the specific state, the lock mechanism restrains the operation part in an inoperable manner when the seat is in the specific state, and the engaged portion and the lock mechanism are connected to each other via transmission means, displacement of the engaged portion is transmitted to the lock mechanism via the transmission means, and the lock mechanism restrains the operation part in an inoperable manner.

2. The seat device according to claim 1, wherein the operation part can be displaced from an ordinary initial position to a using position at the time of operation, the lock mechanism includes a lock pin that can be engaged with and released from the operation part in the initial position, and the lock pin is engaged with the operation part via the transmission means by displacement of the engaged portion, and restrains the operation part in an inoperable manner.

3. A seat device that can convert a state of a seat, comprising:

a reclining mechanism that can tilt a backrest of the seat;

a rotation mechanism that rotates the seat about a rotation axis; and a sliding mechanism that advances and retracts the seat together with the rotation mechanism from a fixed side, wherein an operation of tilting the backrest by the reclining mechanism is disabled when the seat is in a specific state, the state of the seat can be converted by interlocking of the rotation mechanism and the sliding mechanism between a long state where a back of the seat is substantially parallel to and along a wall and a cross state where the back of the seat is away from the wall in an orientation substantially orthogonal to the long state, and the specific state of the seat corresponds to the long state.

* * * * *